US012659043B2

(12) United States Patent
Lee et al.

(10) Patent No.: US 12,659,043 B2
(45) Date of Patent: Jun. 16, 2026

(54) APPARATUS AND METHOD FOR COMPENSATING PERFORMANCE OF TRANSMITTER IN OPTICAL COMMUNICATION SYSTEM

(71) Applicant: ELECTRONICS AND TELECOMMUNICATIONS RESEARCH INSTITUTE, Daejeon (KR)

(72) Inventors: Seung-Woo Lee, Daejeon (KR); Sang Rok Moon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 254 days.

(21) Appl. No.: 18/633,199

(22) Filed: Apr. 11, 2024

(65) Prior Publication Data

US 2024/0348340 A1    Oct. 17, 2024

(30) Foreign Application Priority Data

Apr. 13, 2023    (KR) ......................... 10-2023-0048577

(51) Int. Cl.
H04B 10/524    (2013.01)
H04B 10/58    (2013.01)
(52) U.S. Cl.
CPC ........... H04B 10/524 (2013.01); H04B 10/58 (2013.01)
(58) Field of Classification Search
CPC .............................. H04B 10/524; H04B 10/58

USPC .......................................................... 398/189
See application file for complete search history.

(56) References Cited

U.S. PATENT DOCUMENTS

| | | | |
|---|---|---|---|
| 8,526,537 B2 | 9/2013 | Chen et al. | |
| 2004/0203542 A1* | 10/2004 | Seo et al. ................. | H04B 1/04 |
| | | | 455/126 |
| 2005/0180526 A1 | 8/2005 | Kim et al. | |
| 2007/0153884 A1* | 7/2007 | Balasubramanian et al. ............... | |
| | | | H04L 5/16 |
| | | | 375/221 |
| 2011/0200208 A1 | 8/2011 | Shim et al. | |
| 2021/0152254 A1* | 5/2021 | Duthel et al. .......... | H04B 10/58 |

FOREIGN PATENT DOCUMENTS

| | | |
|---|---|---|
| KR | 10-2005-0071821 A | 7/2005 |
| KR | 10-2011-0105319 A | 9/2011 |

* cited by examiner

*Primary Examiner* — Kenneth N Vanderpuye

(57)    ABSTRACT

Proposed is a technology for compensating for the performance of a transmitter using a pre-distortion method in an optical communication system, wherein a signal sending apparatus may include a transceiver, and at least one controller operably connected to the transceiver, wherein the at least one controller is configured to receive a digital signal, to modulate the digital signal into a PAM signal, to provide the PAM signal to a signal receiving apparatus, to obtain a distortion coefficient value from the signal receiving apparatus, to perform a nonlinear pre-distortion on PAM signals on the basis of the distortion coefficient value, and to provide a result signal generated on the basis of the nonlinear pre-distortion to the signal receiving apparatus.

12 Claims, 6 Drawing Sheets

FIG. 2

Nonlinear
Pre-distortion

FFE

Volterra
FFE

FIG. 5

| Parameter | Description |
|---|---|
| Nffe | The number of taps of FFE |
| Nfbe | The number of taps of FBE |
| Npfe | The number of taps of PFE |
| Ck | filter coefficient of FFE |
| Dk | filter coefficient of FBE |
| Ek | second Volterra filter coefficient |

FIG. 6

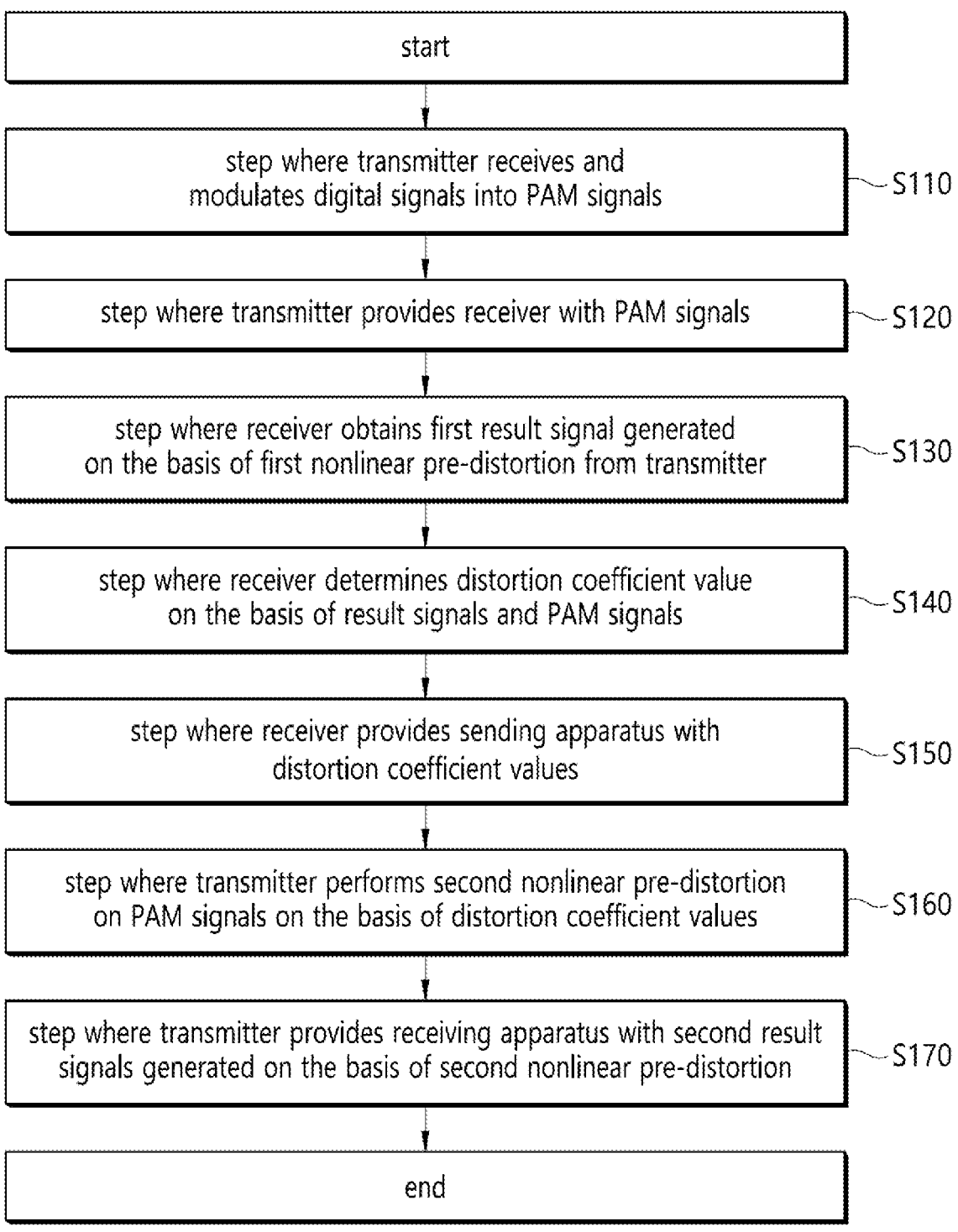

start step where transmitter receives and
modulates digital signals into PAM signals —S110 step where transmitter provides receiver with PAM signals —S120 step where receiver obtains first result signal generated
on the basis of first nonlinear pre-distortion from transmitter —S130 step where receiver determines distortion coefficient value
on the basis of result signals and PAM signals —S140 step where receiver provides sending apparatus with
distortion coefficient values —S150 step where transmitter performs second nonlinear pre-distortion
on PAM signals on the basis of distortion coefficient values —S160 step where transmitter provides receiving apparatus with second result
signals generated on the basis of second nonlinear pre-distortion —S170 end

APPARATUS AND METHOD FOR COMPENSATING PERFORMANCE OF TRANSMITTER IN OPTICAL COMMUNICATION SYSTEM

CROSS REFERENCE TO RELATED APPLICATION

The present application claims priority to Korean Patent Application No. 10-2023-0048577, filed on Apr. 13, 2023, the entire contents of which are incorporated herein for all purposes by this reference.

BACKGROUND

Technical Field

The present disclosure relates to an optical communication system and, more particularly, to a technology for compensating for the performance of a transmitter using a pre-distortion method.

Description of the Related Art

An optical modulator, a driver amplifier that drives the optical modulator, and a digital-to-analog converter (DAC) located at a transmitter are important components in a high-speed data optical communication system. These components may degrade the performance of the system through various linear and nonlinear distortion phenomena. For example, as the data transmission rate (Baud Rate) increases, the relatively low bandwidth of commercial DAC may limit system performance, and signal distortion may occur due to the non-linear characteristics in driver amplifiers and optical modulators, degrading the performance of the transmitter. It is important to reduce such performance degradation of the transmitter since such degradation has a negative impact on the overall system and link performance.

Of methods to reduce such degradation, pre-emphasis is commonly used as a method to overcome the bandwidth limitation of the transmitter by increasing signals in the high-frequency domain. However, this method may be applied on the assumption that the frequency response of the transmitter is exactly known, so there is a problem of requiring substantial time and effort in order to measure and identify the exact frequency response characteristics of each device. Furthermore, there is a problem that the characteristics of this frequency response change depending on the data transmission rate and modulation methods.

In addition, a pre-distortion method is used as another method of equalizing a channel at the transmitter. In general, it is necessary to obtain a pre-distortion or pre-emphasis filter coefficient in order to statically equalize channels. The filter coefficient value obtained from an equalizer of a receiver is used as it is. However, the system performance may be degraded due to the varying performance when having to apply dynamically the filter coefficient value according to the channel characteristics.

Therefore, a method that directly uses the value obtained from the equalizer at the receiver as the coefficient of the transmitter or a method of a pre-distortion based on a Look-Up Table (LUT) through signal level analysis is generally used in order to obtain the coefficient of pre-distortion using an adaptive method. However, since both methods calculate through the received data and the sending data changes, there is a problem that it is difficult to obtain coefficients for accurately equalizing the channel.

SUMMARY

The objective of the present disclosure is to implement an adaptive nonlinear pre-distortion function at a transmitter in a way that nonlinear pre-distortion is used at the transmitter and timing recovery and filter coefficients of a nonlinear equalizer are applied at a receiver.

In an optical communication system according to an exemplary embodiment of the present disclosure, a signal sending apparatus may include a transceiver, and at least one controller operably connected to the transceiver, wherein the at least one controller is configured to receive a digital signal, to modulate the digital signal into a PAM signal, to provide the PAM signal to the signal receiving apparatus, to obtain a distortion coefficient value from the signal receiving apparatus, to perform a nonlinear pre-distortion on PAM signals on the basis of the distortion coefficient value, and to provide a result signal generated on the basis of the nonlinear pre-distortion to the signal receiving apparatus.

In addition, the distortion coefficient value may be updated on the basis of the result signals and the PAM signals.

In addition, a sampling frequency may be converted in order to correspond to an operating frequency, and a synchronization may be applied in order to restore a timing information in the result signal.

In addition, the result signal may be synchronized in a unit of a sample.

In addition, the distortion coefficient value may be determined on the basis of a predetermined algorithm so that the difference between the result signal and the PAM signal is less than or equal to a threshold value.

In addition, the predetermined algorithm may be a least mean square algorithm.

In an optical communication system according to an exemplary embodiment of the present disclosure, a signal receiving apparatus may include a transceiver, and at least one controller operably connected to the transceiver, wherein the at least one controller is configured to obtain a PAM signal from the signal sending apparatus, where the PAM signal is a digital signal modulated in the signal sending apparatus, to obtain a result signal generated on the basis of a nonlinear pre-distortion from the signal sending apparatus, to determine a distortion coefficient value based on the result signal and the PAM signal, and to provide the distortion coefficient value to the signal sending apparatus.

In addition, the at least one controller may be further configured to obtain a subsequent result signal from the signal sending apparatus, where the subsequent result signal is generated at the signal sending apparatus on the basis of the nonlinear pre-distortion performed according to the distortion coefficient value, to generate a subsequent distortion coefficient value on the basis of the subsequent result signal and the PAM signal, and to provide the subsequent distortion coefficient value to the signal sending apparatus.

In addition, at least one processor may be further configured to convert a sampling frequency of the result signal in order to correspond to an operating frequency and to perform a synchronization on the result signal in order to restore a timing information.

In addition, the result signal may be synchronized in a unit of a sample.

In addition, the at least one controller may be configured to determine that the difference between the result signal and the PAM signal is less than or equal to a threshold value by applying a predetermined algorithm in order to determine a distortion coefficient value on the basis of the result signal and the PAM signal.

An optical communication system according to an exemplary embodiment of the present disclosure may include a signal sending apparatus and a signal receiving apparatus, wherein the signal sending apparatus is configured to receive a digital signal, to modulate the digital signal into a PAM signal, to provide the PAM signal to the signal receiving apparatus, to obtain a distortion coefficient value from the signal receiving apparatus, to perform a nonlinear pre-distortion on the PAM signal on the basis of the distortion coefficient value, and to provide a result signal generated on the basis of the nonlinear pre-distortion to the signal receiving apparatus, and the signal receiving apparatus is configured to obtain the PAM signal from the signal sending apparatus, wherein the PAM signal is a digital signal modulated in the signal sending apparatus, to obtain the result signal generated on the basis of the nonlinear pre-distortion from the signal sending apparatus, to determine the distortion coefficient value based on the result signal and the PAM signal, and to provide the distortion coefficient value to the signal sending apparatus.

The present disclosure may have an effect of maintaining the optimal filter coefficient value for a channel response by using an optimal adaptive filter coefficient through updating a coefficient value appropriate for a nonlinear pre-distortion function in a transmitting part by using nonlinear pre-distortion at the transmitter and applying the filter coefficient of the nonlinear equalizer at a receiver.

BRIEF DESCRIPTION OF THE DRAWINGS

FIG. 2 is a view showing a configuration of a nonlinear pre-distortion included in an optical communication system according to an exemplary embodiment of the present disclosure.

FIG. 5 is a view showing a filter coefficient value which is calculated in a nonlinear Volterra filter included in an optical communication system and is sent to a transmitting part according to an exemplary embodiment of the present disclosure.

FIG. 6 is a view showing a flowchart with respect to an operation of an optical communication system according to an exemplary embodiment of the present disclosure.

DETAILED DESCRIPTION OF THE DISCLOSURE

Figure 1:
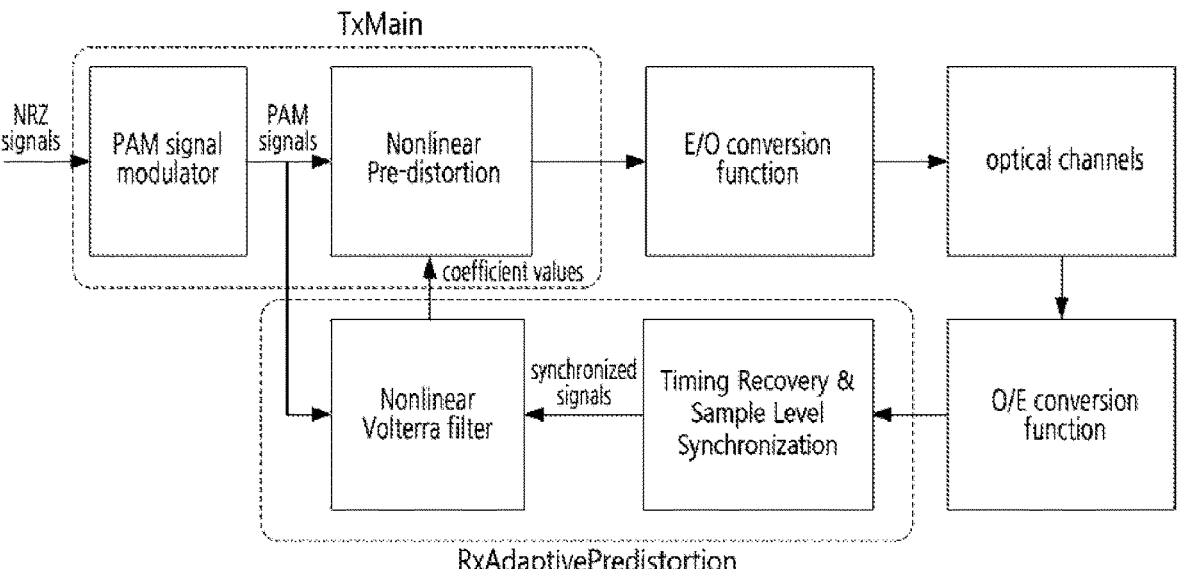
FIG. 1 is a view showing a configuration diagram of an optical communication system according to an exemplary embodiment of the present disclosure.

Some phrases such as "in some exemplary embodiments" or "in an exemplary embodiment" appearing in various places do not necessarily refer to the same exemplary embodiment in the present specification.

Some exemplary embodiments of the present disclosure may be represented by functional block configurations and various processing steps. Some or all of these functional blocks may be implemented with a number of hardware and/or software configurations that execute specific functions. For example, the functional blocks of the present disclosure may be implemented by one or more microprocessors or by circuit configurations for certain functions. In addition, for example, the functional blocks of the present disclosure may be implemented in various programming or scripting languages. The functional blocks may be implemented as algorithms performing on one or more processors. In addition, the present disclosure may adopt conventional technologies for electronic environment settings, signal processing, and/or data processing. Terms such as "mechanism", "element", "means", and "configuration" may be widely used and are not limited to mechanical and physical configurations.

In addition, connection lines or connection members between components shown in the drawings may merely exemplify functional connections and/or physical or circuit connections. In a real device, connections between components may be represented by a variety of alternative or added functional connections, physical connections, or circuit connections.

FIG. 1 is a view showing a configuration diagram of an optical communication system according to an exemplary embodiment of the present disclosure.

Referring to FIG. 1, an optical communication system may include a signal sending apparatus and a signal receiving apparatus for digital pre-distortion.

The signal sending apparatus may include a PAM signal modulator and a nonlinear pre-distortion, and the signal receiving apparatus may include a nonlinear Volterra filter, a timing recovery and a sample level synchronizer.

The signal sending apparatus may generate a PAM signal by converting the NRZ signal through a PAM signal modulator. The generated PAM signal may be input as an input signal of a non-linear pre-distortion. The non-linear pre-distortion may perform nonlinear distortion on the PAM signal and output a nonlinear distortion signal. Thereafter, the signal sending apparatus may input the non-linear distortion signal to an E/O converter.

The nonlinear pre-distortion may receive a coefficient value of the nonlinear pre-distortion (hereinafter, referred to as "a distortion coefficient value") from the signal receiving apparatus. Herein, the distortion coefficient value may be output from a nonlinear Volterra filter included in the signal receiving apparatus.

The nonlinear distortion signal provided from the signal sending apparatus may be sent to the signal receiving apparatus via an E/O converter, an optical channel, and an O/E converter.

The signal receiving apparatus may provide (input) to the timing recovery part and the sample level synchronization part (hereinafter, referred to as received signal as a nonlinear distortion signal) the PAM signals which are provided from the optical channels. The timing recovery part and the sample level synchronization part may output a synchronized signal based on the received input signal.

The nonlinear Volterra filter may obtain synchronized signals and PAM signals. Thereafter, the nonlinear Volterra filter may obtain the synchronized signal and calculate a difference from the PAM signals. Herein, the difference value may be determined through a process of updating a filter coefficient (distortion coefficient value) using a least mean square (LMS) algorithm. In addition, the Volterra filter may obtain the PAM signal from the PAM signal modulator of the signal sending apparatus. That is, the PAM signal that the Volterra filter obtains from the signal sending apparatus may be a signal that is not distorted by the nonlinear distortion.

The way the signal receiving apparatus calculates the difference between the synchronized signal and the PAM signal is as follows. More specifically, in order to obtain the distortion coefficient value, the signal receiving apparatus may utilize the LMS algorithm to equalize the received data and the data of the PAM signal expected to be sent and then obtain the distortion coefficient value to be used in the pre-distortion of the transmitting part. In this case, an LMS algorithm may be used in the distortion coefficient value as follows so that the difference "e" between the received signal and the sending signal converges to zero. The distortion coefficient value may have a characteristic to be gradually adjusted in a direction that minimizes the error between the received signals and the sending signals. The signal receiving apparatus may perform the timing recovery on the received signals to equally compare the data received from the signal sending apparatus with the data of the PAM signal sent from the PAM signal modulator of the signal sending apparatus.

The timing recovery part included in the signal receiving apparatus may include at least one of a sampling rate conversion, a timing recovery algorithm performance, and sample synchronization in order to be applied to an IM/DD system and perform a recovery operation for comparing received PAM signals with the sending signals.

The timing recovery algorithm may be an algorithm for symbol synchronization. That is, timing errors caused by a sampling frequency offset and sampling phase offset may lead to a performance degradation of a system, so the timing recovery part may be capable of performing the timing recovery in order to estimate and compensate for these timing errors.

A symbol timing synchronization may be an operation of finding an optimal sampling point when down-sampling a series of samples into a series of symbols. Accordingly, the timing recovery part may focus on selecting the best sample among all samples so that the selected sample may have a more accurate value for the transmitted symbol. Thereafter, the sample regarded as the selected symbol may be transmitted to a symbol detector.

The synchronization operation performed in the timing recovery part may be a sample synchronization rather than a symbol synchronization. Specifically, the timing recovery part may be capable of performing the sample synchronization in order to sample symbols to have an accurate frequency response by matching the samples exactly the same.

The nonlinear equalizer included in the signal receiving apparatus may include at least one of a part that calculates the difference between the target sending signals and the received signal in order to obtain a filter coefficient to be used for the nonlinear distortion function and a part that updates the filter coefficient by applying an LMS algorithm to the sending signal and the received signal.

Herein, the signal receiving apparatus may calculate the LMS using a target sample, so may not use a method of calculating the feedback coefficient using symbols. In this case, a verification may be performed to ensure whether the feedback coefficient is accurately calculated.

Figure 2:
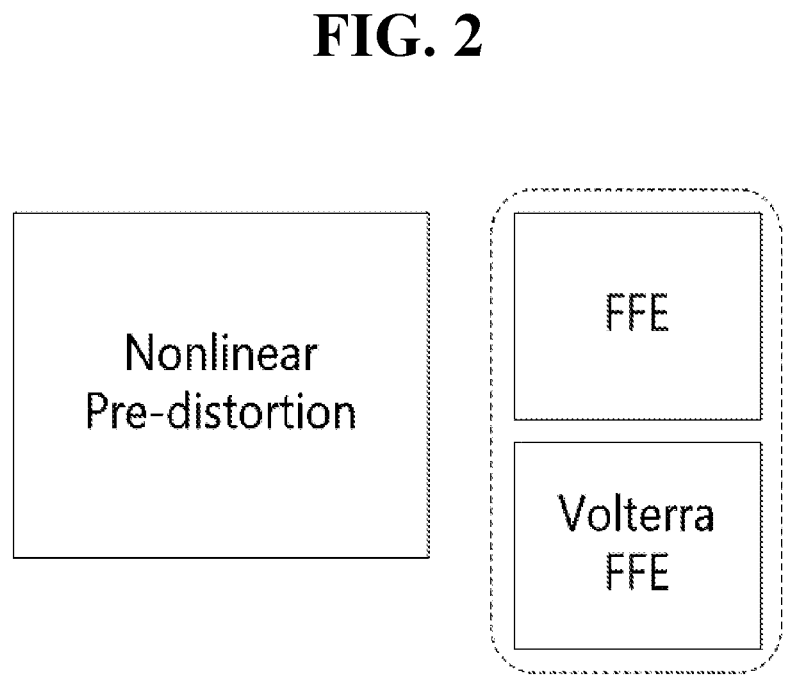

FIG. 2 is a view showing a configuration of a nonlinear pre-distortion included in an optical communication system according to an exemplary embodiment of the present disclosure.

In general, the nonlinear pre-distortion included in the signal sending apparatus may include at least one of a linear feedforward part, and a second Volterra feedforward filter and linear feedback part.

Referring to FIG. 2, the nonlinear pre-distortion according to an exemplary embodiment of the present disclosure may be added by a VFFE of a second nonlinear feedforward component as the conventional feedforward equalizer (FFE) and a nonlinear equalizer.

Figure 3:
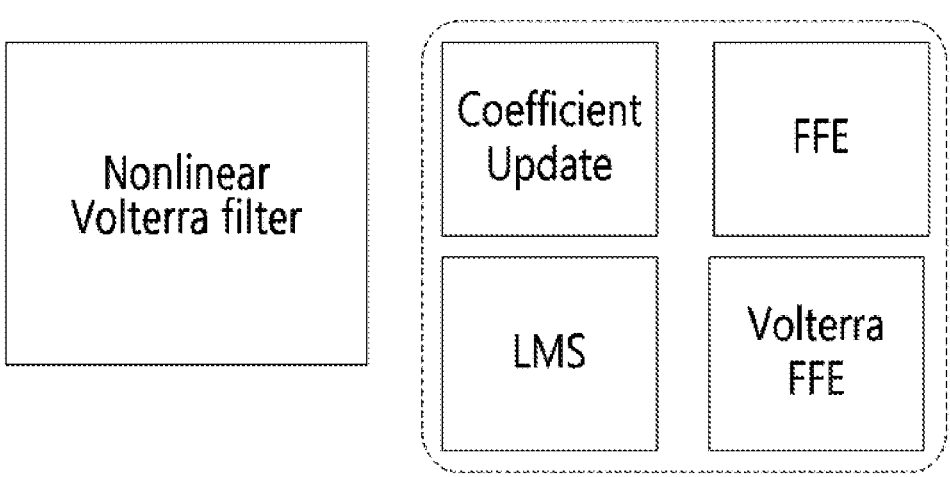
FIG. 3 is a view showing a configuration of a nonlinear Volterra filter included in an optical communication system according to an exemplary embodiment of the present disclosure.

FIG. 3 is a view showing a configuration of a nonlinear Volterra filter included in an optical communication system according to an exemplary embodiment of the present disclosure.

Referring to FIG. 3, the nonlinear Volterra filter may further include a VFFE of a secondary nonlinear feedforward component as a conventional FFE and a nonlinear equalizer. In addition, the nonlinear Volterra filter may determine and update the distortion coefficient on the basis of the LMS algorithm.

Figure 4:
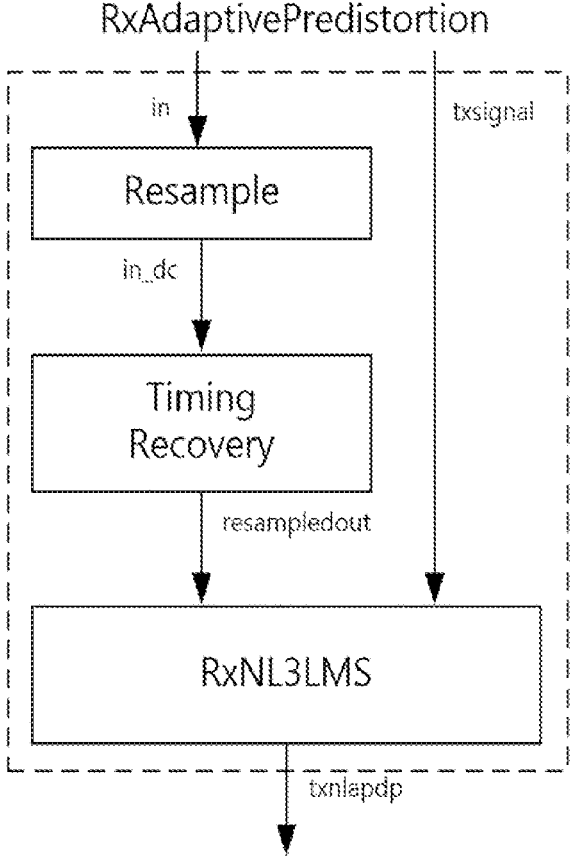
FIG. 4 is a view showing an operation of an adaptive pre-distortion of a signal receiving apparatus.

FIG. 4 is a view showing an operation of the adaptive pre-distortion of the signal receiving apparatus.

Referring to FIG. 4, the adaptive pre-distortion (RxAdaptivePredistortion) of the signal receiving apparatus may obtain the received signal (in) and the sending signal (txsignal) outputted from the PAM signal modulator. Thereafter, a coefficient value of a pre-distortion filter (distortion coefficient value) to be transmitted to the pre-distortion of the signal sending apparatus may be generated and outputted on the basis of each of the obtained signals.

The signal receiving apparatus may perform a resampling, a timing recovery, and a nonlinear filter (RxNL2LMS) function in order to generate a distortion coefficient value.

The resampling may be a function of converting the received signal (in) from the OSC to a sampling frequency again to correspond to the operating frequency, and the timing recovery may be a function of synchronizing the received signal. In addition, the nonlinear filter may include a feedforward filter, a Volterra filter, or the like, and may calculate the filter coefficient value using the LMS algorithm so that the difference value "e" between the received signal and the sending signal is close to zero. Thereafter, the signal receiving apparatus may output the calculated filter coefficient value (txnapdp).

Unlike a conventional symbol equalizer, the signal receiving apparatus may perform a synchronization in a unit of a sample in order to obtain a distortion coefficient value in an optical communication system according to an exemplary embodiment of the present disclosure.

The signal receiving apparatus in an optical communication system according to an exemplary embodiment of the present disclosure may further perform a confirmation process for adaptation and stabilization with respect to the distortion coefficient value in order to analyze whether the synchronization of the sample unit has operated correctly.

FIG. 4 is a view showing a configuration of a nonlinear pre-distortion included in an optical communication system according to an exemplary embodiment of the present disclosure.

FIG. 5 is a view showing that a filter coefficient value is calculated in a nonlinear Volterra filter included in an optical communication system and is sent to a transmitting part according to an exemplary embodiment of the present disclosure.

Referring to FIG. 5, Nffe refers to the number of taps of the feedforward equalizer, Nfbe refers to the number of taps of the feedback equalizer, Npfe refers to the number of taps of the feedforward equalizer of a Volterra filter, Ck refers to the filter coefficient of the feedforward equalizer, Dk refers to the filter coefficient of the feedback equalizer, and Ek refers to the second Volterra filter coefficient.

FIG. 6 is a view showing a flowchart with respect to an operation of an optical communication system according to an exemplary embodiment of the present disclosure.

Referring to FIG. 6, a signal sending apparatus (hereinafter, referred to as "a transmitter") and a signal receiving apparatus (hereinafter, referred to as "a receiver") in an optical communication system according to an exemplary embodiment of the present disclosure may perform separate operations in each step.

In a step S110, the transmitter may receive and modulate the digital signal into the PAM signal.

The transmitter may receive digital signals in the form of a non-return-to-zero (NRZ) signal in an optical communication system. Thereafter, the transmitter may modulate the NRZ signal into a pulse amplitude modulation (PAM) signal for transmission over the optical channel.

Specifically, the transmitter may perform an operation of mapping binary 1 and 0 of the NRZ signal to a specific amplitude of the optical pulse of the PAM signal in order to modulate the NRZ signal into the PAM signal. For example, binary 1 of the NRZ signal may be mapped to a higher amplitude pulse of the PAM signal and binary 0 may be mapped to a lower amplitude pulse.

In a step S120, the transmitter may provide PAM signals to the receiver.

The transmitter may transmit the PAM signals to the receiver through an optical channel. Specifically, the transmitter may transmit the PAM signal to the nonlinear Volterra filter of the receiver.

In a step S130, the receiver may obtain a first result signal generated on the basis of a first nonlinear pre-distortion from the transmitter.

The first result signal may mean a nonlinear distortion signal which the transmitter generates through nonlinear pre-distortion of the PAM signals. Specifically, the transmitter may generate the first result signal by distorting the PAM signal through the nonlinear pre-distortion. Thereafter, when generated, the first result signal may be transmitted to the receiver through an optical channel. The receiver may receive and demodulate the PAM signals back to the original digital signal. The operation of demodulating into a digital signal may include detecting the amplitude of each pulse in the first result signal and converting back to a corresponding binary value that can be used to reconstruct the original digital signal.

In a step S140, the receiver may determine a distortion coefficient value based on the result signal and the PAM signal.

Herein, the distortion coefficient value may be updated on the basis of the first result signal and the PAM signal.

Specifically, the sampling frequency in the first result signal may be converted in order to correspond to the operating frequency, and the synchronization may be applied to restore a timing information. Herein, the synchronization for the first result signal may be performed in a unit of a sample.

Specifically, the distortion coefficient value may be determined on the basis of a predetermined algorithm so that the difference between the result signal and the PAM signal is less than or equal to a threshold value. For example, the predetermined algorithm may be a least mean square algorithm.

In a step S150, the receiver may provide the distortion coefficient value to the signal sending apparatus.

Specifically, the nonlinear Volterra filter of the receiver may provide the distortion coefficient value to the nonlinear pre-distortion of the transmitter. The distortion coefficient value provided to the transmitter may change (update) the previously provided distortion coefficient value.

In a step S160, the transmitter may perform a second nonlinear pre-distortion on the PAM signal on the basis of the distortion coefficient value.

This step is the same as the step S130, and may be understood as an operation in which the transmitter generates a result signal by applying the changed distortion coefficient value.

In a step S170, the transmitter may provide the second result signal generated on the basis of the second nonlinear pre-distortion to the signal receiving apparatus.

The exemplary embodiment of the present disclosure described is not implemented only through an apparatus and method, but also may be implemented through a program for realizing a function corresponding to configurations of the exemplary embodiment of the present disclosure or a recording medium in which the program is recorded.

Although the exemplary embodiments of the present disclosure have been described in detail above, the scope of the present disclosure is not limited thereto, and various modifications and improvements of those skilled in the art using the basic concept of the present disclosure defined in the following claims also belong to the scope of rights of the present disclosure.

The description above is specific exemplary embodiments for implementing the present disclosure. The present disclosure will include not only the above exemplary embodiments, but also exemplary embodiments that may be simply designed or easily changed. In addition, the present disclosure will include techniques that may be easily modified and implemented using exemplary embodiments. Accordingly, the scope of the present disclosure should not be limited to the exemplary embodiments described above and should be determined not only by the claims described below but also by those equivalent to the claims of the present disclosure.

What is claimed is:

1. A signal sending apparatus in an optical communication system, the signal sending apparatus comprising:

a transceiver, and at least one controller operably connected to the transceiver, wherein the at least one controller is configured to receive a digital signal, to modulate the digital signal into a PAM signal, to provide the PAM signal to a signal receiving apparatus, to obtain a distortion coefficient value from the signal receiving apparatus, to perform a nonlinear pre-distortion on the PAM signal on the basis of the distortion coefficient value, and to provide a result signal generated on the basis of the nonlinear pre-distortion to the signal receiving apparatus.

2. The apparatus of claim 1, wherein the distortion coefficient value is updated on the basis of the result signal and the PAM signal.

3. The apparatus of claim 2, wherein in the result signal a sampling frequency is converted in order to correspond to an operating frequency, and a synchronization is applied in order to restore a timing information.

4. The apparatus of claim 3, wherein the synchronization is performed in a unit of a sample in the resulting signal.

5. The apparatus of claim 2, wherein the distortion coefficient value is determined on the basis of a predetermined algorithm such that a difference between the result signal and the PAM signal is less than or equal to a threshold value.

6. The apparatus of claim 5, wherein the predetermined algorithm is a least mean square algorithm.

7. A signal receiving apparatus in an optical communication system, the signal receiving apparatus comprising:

a transceiver, and at least one controller operably connected to the transceiver, wherein the at least one controller is configured to obtain a PAM signal from a signal sending apparatus, wherein the PAM signal is a digital signal modulated in the signal sending apparatus, to obtain a result signal generated on the basis of a nonlinear pre-distortion from the signal sending apparatus, to determine a distortion coefficient value based on the result signal and the PAM signal, and to provide the distortion coefficient value to the signal sending apparatus.

8. The apparatus of the claim 7, wherein the at least one controller is further configured to obtain a subsequent result signal from the signal sending apparatus, wherein the subsequent result signal is generated in the signal sending apparatus on the basis of the nonlinear pre-distortion performed according to the distortion coefficient value, to generate a subsequent distortion coefficient value on the basis of the subsequent result signal and the PAM signal, and to provide the subsequent distortion coefficient value to the signal sending apparatus.

9. The apparatus of claim 7, further comprising at least one processor that is configured to convert a sampling frequency of the result signal in order to correspond to an operating frequency, and to perform a synchronization on the result signal in order to restore a timing information.

10. The apparatus of claim 9, wherein the synchronization is performed in a unit of a sample in the result signal.

11. The apparatus of claim 7, wherein the at least one controller is configured to determine that a difference between the result signal and the PAM signal is less than or equal to a threshold value by applying a predetermined algorithm in order to determine the distortion coefficient value on the basis of the result signal and the PAM signal.

12. An optical communication system, the system comprising:

a signal sending apparatus; and a signal receiving apparatus, wherein the signal sending apparatus is configured to receive a digital signal, to modulate the digital signal into a PAM signal, to provide the PAM signal to a signal receiving apparatus, to obtain a distortion coefficient value from the signal receiving apparatus, to perform a nonlinear pre-distortion on the PAM signal on the basis of the distortion coefficient value, and to provide a result signal generated on the basis of the nonlinear pre-distortion to the signal receiving apparatus, and the signal receiving apparatus is configured to obtain the PAM signal from the signal sending apparatus, wherein the PAM signal is a digital signal modulated in the signal sending apparatus, to obtain the result signal generated on the basis of nonlinear pre-distortion from the signal sending apparatus, to determine the distortion coefficient value based on the result signal and the PAM signal, and to provide the distortion coefficient value to the signal sending apparatus.

* * * * *